United States Patent [19]
Martin

[11] Patent Number: 4,503,587
[45] Date of Patent: * Mar. 12, 1985

[54] AUTOMATIC POULTRY BREAST PROCESSING MACHINE AND METHOD

[75] Inventor: Eugene G. Martin, Ephrata, Pa.

[73] Assignee: Victor F. Weaver Holding Co., Inc., New Holland, Pa.

[ * ] Notice: The portion of the term of this patent subsequent to Jan. 10, 2001 has been disclaimed.

[21] Appl. No.: 576,447

[22] Filed: Dec. 16, 1983

[51] Int. Cl.³ .............................................. A22C 21/00
[52] U.S. Cl. ........................................... 17/52; 17/11
[58] Field of Search ....................................... 17/11, 52

[56] References Cited
U.S. PATENT DOCUMENTS

| | | |
|---|---|---|
| 2,920,343 | 1/1960 | Bartels et al. |
| 2,961,697 | 11/1960 | Schlichting |
| 3,639,945 | 2/1972 | Duncan et al. ...................... 17/52 X |
| 3,731,344 | 5/1973 | Phares et al. ............................. 17/11 |
| 3,942,222 | 3/1976 | Strandine et al. |
| 4,016,624 | 4/1977 | Martin et al. ....................... 17/52 X |
| 4,083,083 | 4/1978 | Duncan et al. ......................... 17/11 |
| 4,270,243 | 6/1981 | Lewis |
| 4,373,232 | 2/1983 | Harding et al. ......................... 17/11 |

Primary Examiner—Willie G. Abercrombie
Attorney, Agent, or Firm—Caesar, Rivise, Bernstein & Cohen, Ltd.

[57] ABSTRACT

A poultry breast processing machine having a conveyor adapted to receive forward bilateral poultry carcass sections comprised of the joined breast, back and whole wings and to transport the carcass sections through one or more optional segmenting operations. In one operation the wings are engaged and extended laterally outwardly to cause, in conjunction with the passage of shielded rotary severing knives through stretched shoulder joint connecting tissue and tendon materials, the dislocation of shoulder joints and automated removal of whole wing sections from the carcass section without shattered bone fragment contamination and with substantially no removal of breast meat with the wings. The wing removal operation can be followed by a breast severing operation in which a rotary blade longitudinally splits the breast of the carcass, and then either by a backbone removal operation accomplished by transversely spaced rotary blades or by a back bisecting operation accomplished by a single rotary blade.

35 Claims, 25 Drawing Figures

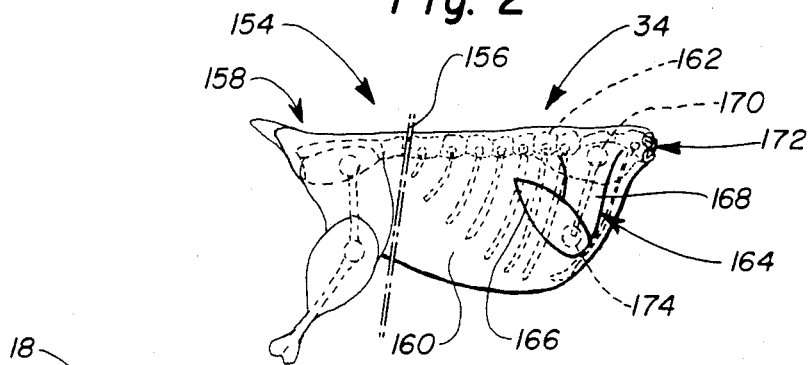
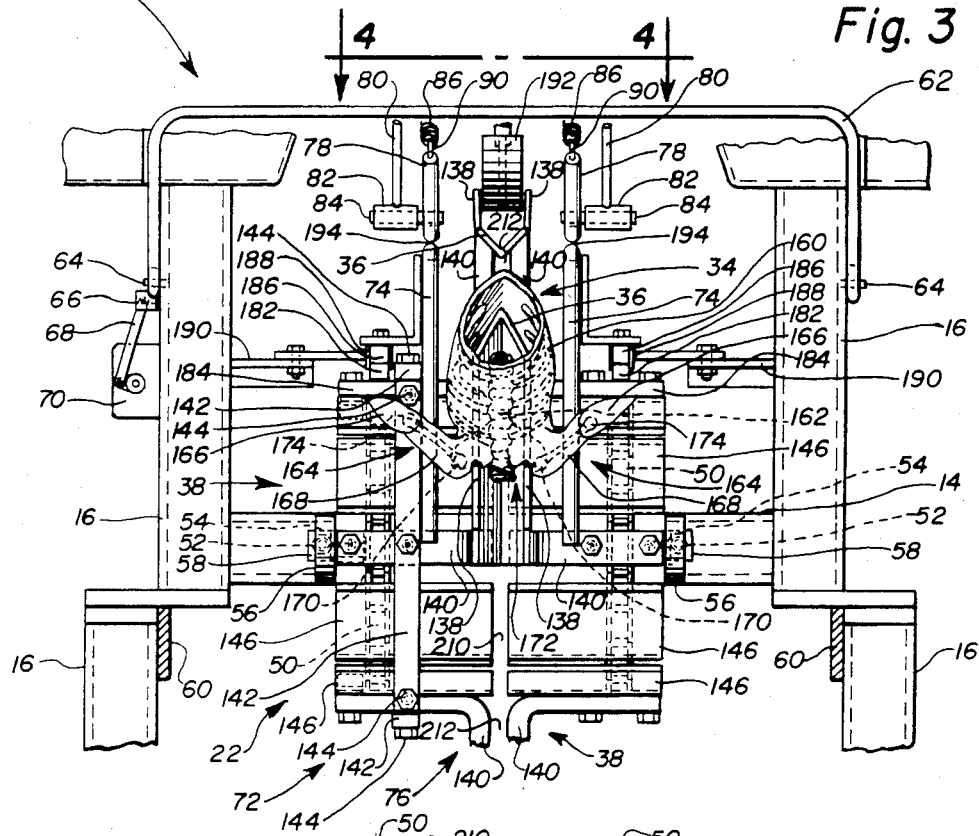
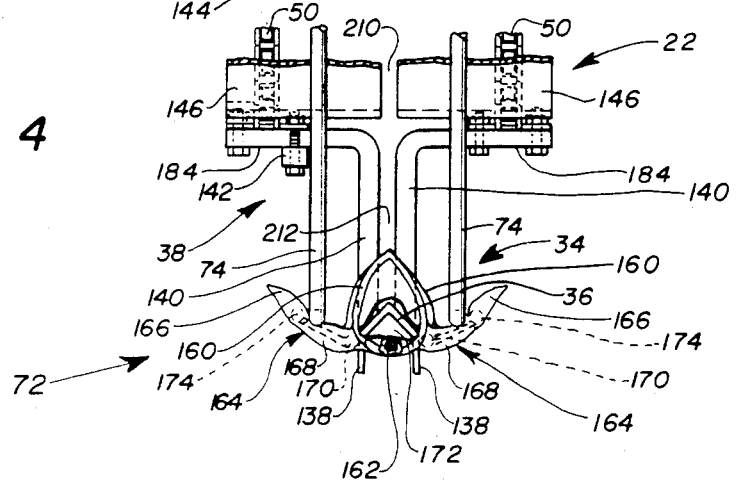

AUTOMATIC POULTRY BREAST PROCESSING MACHINE AND METHOD

This application is a continuation of copending U.S. patent application Ser. No. 364,604, filed on Apr. 1, 1982, now U.S. Pat. No. 4,424,608 and entitled Automatic Poultry Breast Processing Machine and Method.

BACKGROUND OF THE INVENTION

The instant invention relates to an automatic poultry breast processing machine adapted to receive from other processing operations forward bilateral poultry carcass sections and by means of employing one or more of the automatically operational optionally selective cutting stations provided, and processing method thereof, deliver therefrom various reduced carcass section portions consistent with meeting changing consumer demands in the providing of both pre-processed market pack and convenience food poultry cuts, wherein the machine hereof further provides both the mechanism and method for accomplishing "button cut" removal of whole wings from the forward bilateral poultry carcass section member, that is, a close tolerance severable removal of wings at the forward bilateral poultry section shoulder joint without an over-cut removal therewith of breast meat. In the foregoing regard, and hereinafter, it is to be understood the term "poultry" includes fowl of various types being but not necessarily limited to old and young chickens, turkeys, geese, ducks, guineas, squabs, and the like.

Under the circumstances of current and increasing competitive conditions in the evolution and market development of new poultry preparation items, and especially with respect to such in the convenience and so-called "fast food" uses of chicken to provide a selection of pieces which are easily prepared and served and are not contaminated with either scraped or broken bone fragments while at the same time having been processed to contain the maximum amount of that particular premium cut of meat being sold, the continuing development of processing machinery to meet both the quantity and quality of product demand has been towards a reduction of the machine size and number of carcass segmentation operations to be performed thereby, and to process a preliminary reduced size carcass section at a moderate run speed thereby to maintain better close tolerance control in effecting automated severing operations and ultimately delivering a higher net output of higher grade segmented product at substantially reduced fixed capital and maintenance cost factors for machinery, and at no greater or a reduced labor cost per piece processed due to the increased net output method to yield a consistently higher quality product.

Exemplary of those prior art disclosures which teach poultry carcass section segmentation machinery employing moderate speed close tolerance cutting methods as heretofore characterized would first be that as set forth in U.S. Pat. No. 3,731,344 to Phares et al dated May 8, 1973, wherein forward poultry carcass sections similar to those processed by the instant machine and method of invention, which have likewise been obtained from previous lateral bisecting of whole bird carcasses intermediately across the longitudinal axis thereof in other processing operations, are sequentially inward fed with the rearward ends thereof forward leading to a spike chain conveyor for delivery to a wing and breast saw combination adapted to remove both wings at the shoulder joint and thereafter divide the breast longitudinally followed by a spaced set of downwardly disposed parallel rotary blades for accomplishing longitudinally extending laterally spaced cuts equidistant from the spinal cord to effect removal of the backbone. Other secondary prior art disclosures also teaching poultry carcass segmenting machinery employing moderate speed close tolerance cutting means and methods would include U.S. Pat. No. 3,639,945 to Duncan et al dated Feb. 8, 1972, U.S. Pat. No. 4,083,083 also to Duncan et al dated Apr. 11, 1978, and U.S. Pat. No. 4,270,243 to Lewis dated June 2, 1981, all of which in one or more respects are functionally similar to but patentably distinguished from the machine and method of instant invention.

Additional prior art of a pertinent but distinguishable nature with respect to the instant invention mechanism to slidably engage and guidably move the respective appended wings outwardly from the shoulder connecting joint of the bilateral carcass section to thereby cause a dislocation thereof and in so doing further thereby effect separation of the wing-to-body connecting ball-and-socket joint and thus enable the clean clear close tolerance passage of the shielded rotary severing knives of instant invention teaching through stretched shoulder joint connecting tissue and tendon to accomplish the "button cut" method hereof for removal of whole wings would be as taught in Duncan et al U.S. Pat. No. 3,639,945 and Phares et al cited supra, and Martin et al in his previous coinventively issued U.S. Pat. No. 4,016,624 dated Apr. 12, 1977, particularly with respect to FIG. 15d and the corresponding explanatory text matter thereof. With respect to shielded rotary cutting blade severing of carcass section members, the prior art citing of Duncan et al U.S. Pat. No. 4,083,083 is pertinent particularly with respect to element 122 shown in FIG. 13 thereof. Also of a pertinent nature with respect to close tolerance shielded rotary blade severing, as applied to fish heading, would be the respective teachings of Bartels et al in U.S. Pat. No. 2,920,343 dated Jan. 12, 1960, and Schlichting in U.S. Pat. No. 2,961,697 dated Nov. 29, 1960.

One final teaching of a pertinent nature, particularly with respect to types of whole poultry carcass sectioning cuts and the incising methods therefor in market preparation thereof for ease of separation by the consumer for segmentation into either reduced carcass sections or further into individual pieces would be as taught in U.S. Pat. No. 3,942,222 to Strandine et al dated Mar. 9, 1976.

It should be understood that some of the features of the instant invention have, in some cases, structural and functional similarities to teachings separately set forth in the prior art disclosures heretofore cited and briefly discussed. However, as will hereinafter be pointed out, the instant invention is distinguishable from said earlier inventions in one or more ways in that the present invention has utility features and new and useful advantages, applications, and improvements in the art of automatic poultry breast processing machinery and method not heretofore known.

SUMMARY OF THE INVENTION

It is the principal object of the present invention to provide an automatic poultry breast processing machine adapted to sequentially receive forward bilateral poultry carcass sections comprised of the joined breast and back with whole wings thereto attached and thereafter optionally remove the wings and backbone therefrom for further automatic optionally selective processing machine segmentation of the remaining breast section into various pieces and thereby provide an automated capability for delivering a variety of combinations of reduced forward bilateral poultry carcass section portions consistent with the then current market demands.

Another object of the present invention is to provide both an automatic poultry breast processing machine apparatus and method for accomplishing the so-called "button cut" by being adapted to conveniently and conveyably bias simultaneously the respective forward bilateral poultry carcass section wings in opposing outward bilateral distension away from the shoulder connecting joints thereof to thereby respectively cause shoulder joint dislocations and thereupon permit an unobstructed passage of shielded rotary severing blades through stretched shoulder joint connecting tissue and tendon between bone end protuberances thereof and further thereby optionally enable effecting automatic removal of whole wing sections from said carcass section with substantially no removal of breast meat therewith.

Still another object of the present invention is to provide an automatic poultry breast processing machine adapted for sequential manual feeding and placement of forward bilateral poultry carcass sections upon indexed infeed conveyor regularly spaced support and transport spikes accomplished through a minimum distance manual feed path by way of an operator natural and safe motion pattern.

It is also another object of the present invention to provide an automatic poultry breast processing machine having infeed conveyor support and transport spike carcass section placement registration guide and stop means which enable the facilitated rapid and accurate manual feeding placement and positive retention of said carcass sections for performance and accomplishment of close tolerance selective sectioning operations thereon as aforesaid.

Yet another object of the present invention is to provide an automatic poultry breast processing machine of the type described which mechanically consolidates flexibly various processing operation function options and alternatives which have heretofore been relatively time consuming and separate mechanically or manually accomplished processing operations.

It is still another object of the present invention to provide an automatic poultry breast processing machine of the type described which is safe and relatively simple in operation, as well as a machine which requires a minimum of make-ready time in addition to a machine which may be set and operated by an average employee not possessed of special skills or training.

Yet another object of the present invention is to provide an automatic poultry breast processing machine of the type described which is sanitary in operation, enables the optionally selective reduction of a forward bilateral poultry carcass section into various pieces without causing bone shattering and consequent bone fragment contamination of the delivered segmented meat product portions, and is easily accessible for quick and thorough cleaning.

Still another object of the present invention is to provide an automatic poultry breast processing machine of the type described which is adequately adjustable to enable the processing accommodation of different poultry varieties and sizes.

Details of the foregoing objects and of the invention, as well as other objects thereof, are set forth in the following specification and illustrated in the accompanying drawings comprising a part thereof.

BRIEF DESCRIPTION OF THE DRAWINGS.

FIG. 2 is an enlarged side elevation of an exemplary eviscerated whole poultry carcass section therein showing a typical severing line whereby the same is generally separated into a forward bilateral poultry carcass section and a rearward bilateral poultry carcass section.

FIG. 3 is an enlarged infeed end elevation of the processing machine shown in FIG. 1 as seen along the line 3—3 thereof.

FIG. 4 is a top plan view of the processing machine infeed end shown in FIG. 3 with a forward bilateral poultry carcass section positioned for processing conveyance upon an infeed conveyor support and transport spike all as seen along the line 4—4 thereof.

FIG. 10a is a simplified top plan view illustration showing the relative anatomical disposition configuration of a forward bilateral poultry carcass section during processing infeed to the optionally selective automated bilateral wing severing blade operational assembly of the instant machine invention.

FIG. 10b is a simplified top plan view illustration progressively showing the relative anatomical disposition configuration of the forward bilateral poultry carcass section previously shown in FIG. 10a but during continued processing infeed engagement thereof by the bilaterally spaced wing severing blade pivotal shields of said optionally selective automated bilateral wing severing blade operational assembly.

FIG. 10c is a simplified top plan view illustration further showing the relative anatomical disposition configuration of the forward bilateral poultry carcass section previously shown in FIG. 10b as seen during continued processing infeed engagement of the respective dislocated opposingly outward distended shoulder joint tissue and tendons to permit unobstructed passage therethrough of the bilateral wing severing blades of said optionally selective automated bilateral wing severing blade operational assembly.

FIG. 10d is a simplified top plan view illustration showing the relative anatomical disposition configuration of the partially processed forward bilateral poultry carcass section previously shown in FIG. 10c as seen upon completion of the wing removal cuts as accomplished by the bilateral wing severing blades of said optionally selective automated bilateral wing severing blade assembly.

DETAILED DESCRIPTION OF THE INVENTION

Figure 1:
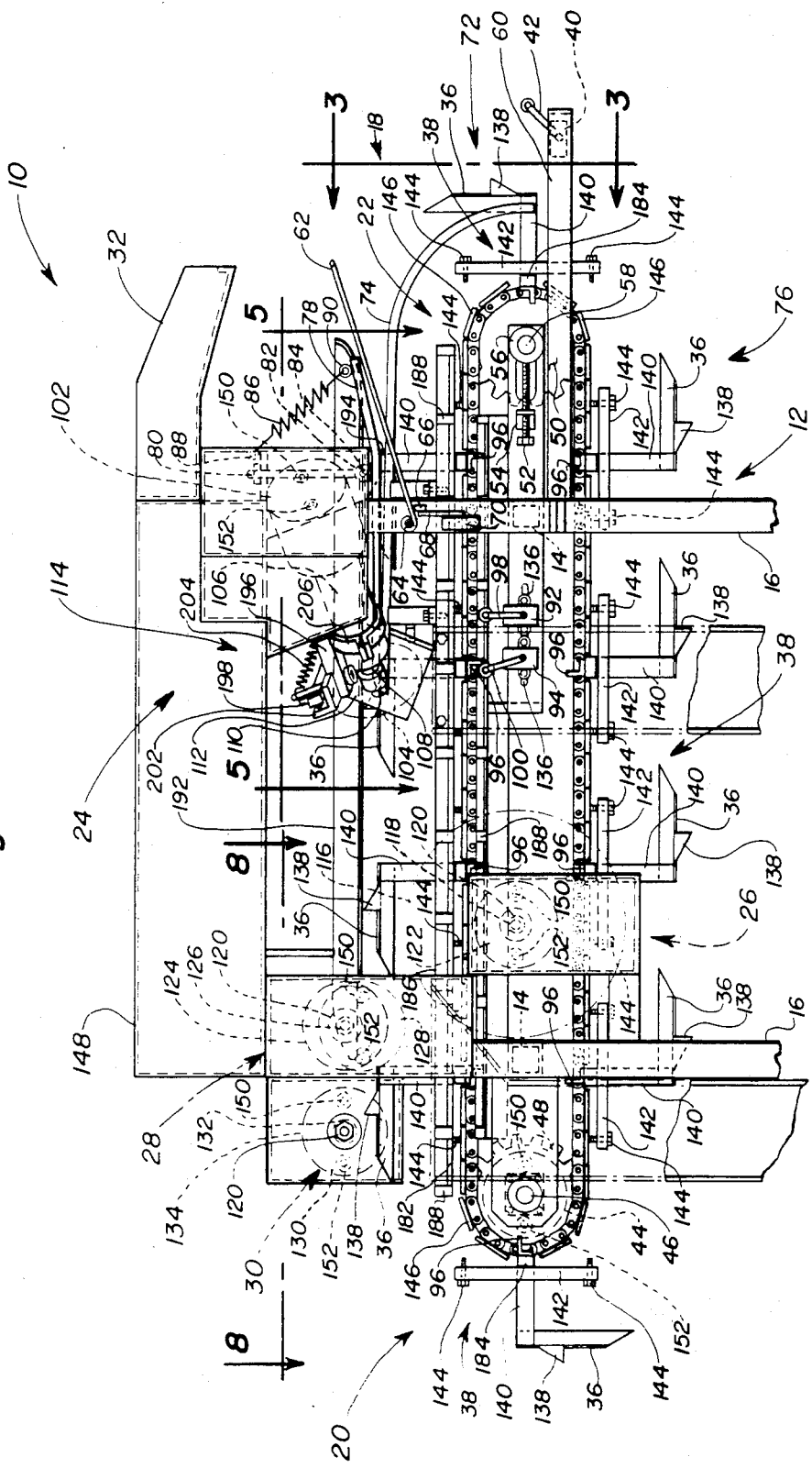
FIG. 1 is a side elevation of the automatic poultry breast processing machine comprising the instant invention, being shown with the various optionally selective automated bilateral poultry carcass section severing blade operational assemblies thereof illustrated in phantom.

Referring to FIG. 1, the present invention is shown which comprises an automatic poultry breast processing machine 10 having a longitudinally extending rigid supporting frame structure 12 comprised of horizontally and vertically disposed structural members respectively 14 and 16 interconnectedly disposed to provide an infeed end 18 and a delivery end 20 therebetween which is assembled a downwardly disposed longitudinally extending infeed and transport conveyor 22 rotatably intercommunicating within said supporting frame structure 12 intermediate a plurality of vertically disposed longitudinally arrayed optionally selective automated severing blade assembly stations being first an upwardly disposed angularly downward acting spaced set of bilateral wing severing blade operational assemblies 24 followed by a downwardly disposed centrally intermediate upward acting breast severing blade operational assembly 26 and thereafter by an upwardly disposed angularly downwardly acting spaced set of backbone removal severing blade operational assemblies 28 and then an optionally alternate upwardly disposed centrally intermediate downward acting backbone severing blade operational assembly 30 all employable individually or in various optionally selective or alternate combinations as a machine 10 means for accomplishing severable reduction of sequentially fed bilateral poultry carcass sections selectively into various pieces by the methods hereof as hereinafter more fully described.

Referring again to FIG. 1 to describe in greater detail the component parts of this invention as well as explain the general operation thereof, wherein is also shown the infeed staging tray 32 adapted to receive and thereafter hold for manual placement feeding therefrom successively through a minimum distance feed path forward bilateral poultry carcass sections, not seen in FIG. 1 but illustrated in FIG. 2 and certain subsequent Figures hereinafter discussed being respectively therein designated by the numeral 34, into supportable impaled engagement upon an infeed conveyor transport spike 36 adjustably assembled to the infeed and transport conveyor 22 by transport spike bracket assembly 38 for incremental processing movement thereby of carcass sections selectively and/or alternately into and through one or more of said severing blade operational assemblies 24, 26, 28, or 30 as aforementioned and hereinafter more fully described.

Initiation of the carcass section infeed processing operation is upon activation of the infeed and transport conveyor start switch 40 by operator torso engagement and arcuate deflection of the switch lever 42 thereof thereby energizing the infeed and transport conveyor hydraulic drive motor 44 to transmit infeed drive motion through conveyor drive shaft 46 connectably operable to power conveyor dual drive sprocket 48 in imparting rotary motion to said conveyor 22 in cleated engagement therewith in tensionably adjustable drive about longitudinally displaceable infeed and transport conveyor dual idler sprocket 50 adjustably moveable in either extension or retraction longitudinally by means of idler sprocket adjustment bolt 52 threadably operable through adjustment bolt bracket 54 in compressive engagement and movement of idler sprocket shaft bearing 56 within which the idler sprocket shaft 58 of said dual idler sprocket 50 rotates, whereupon said infeed conveyor transport spikes 36 assembled to said conveyor 22 by means of said transport spike bracket assemblies 38 are caused to move forward with processing machine infeed and transport conveyor 22 displacement motion and thereby supportably pass in registered movement into and through said machine 10 carcass sections 34 for selective accomplishment of processing operations thereon by said severing blade operational assemblies 24, 26, 28 or 30.

Operational safety features of said machine 10 shown in FIG. 1 include the generally U-shaped safety bumper 60 which provides an operator guard about the machine 10 infeed and conveyor mechanisms and also serves as an affixment support means for said infeed and transport conveyor start switch 40 as shown, and thereabove within reach of a typical operator when postured in a torso-contact position of proximity restraint against the switch lever 42 side of said safety bumper 60 is the generally U-shaped machine 10 emergency shut-off switch lever bar 62 operable upon pivotal downward hand activated displacement about lever bar pins 64 to arcuately move bar lug 66 against shut-off switch lever 68 thereby deflecting the latter and opening the normally closed emergency shut-off switch 70 thus immediately and automatically stopping all of the machine 10 conveying and processing operational functions in the event of either a carcass section processing jam or operating personnel hazard condition.

Considering FIG. 1 now in terms of the carcass section support, guidance and control means and generally the various optionally selective and/or alternate processing operation capability functions provided and accomplished by said machine 10. Infeed of the carcass section members, not illustrated in FIG. 1 but shown in FIGS. 3 and 4 to be hereinafter more fully detailed but briefly described now for purposes of providing a basis in further immediate explanation, is by sequential manual removal of individual carcass section members 34 from the infeed staging tray 32 and impaledly disposing them upon the infeed load position 72 infeed conveyor transport spike 36 for inward transport feed of said carcass sections 34 with the rearward ends forward leading and the respective whole wing members thereof outwardly distended from the shoulder joint point of attachment to be supportably engaged by infeed wing support guide rods 74. After each carcass section is manually positioned upon that infeed conveyor transport spike 36 located at the infeed load position 72 generally as above described, the operator then makes forward torso contact with the switch lever 42 as he simultaneously reaches outward and up and forward with a butterfly arm motion to manually obtain another carcass section from the infeed staging tray 32 while at the same time the infeed and transport conveyor start switch 40 being activated by said switch lever 42 deflection is made whereupon the transport conveyor hydraulic drive motor 44 is energized and the infeed and transport conveyor 22 by rotary drive transmission thereto through conveyor dual drive sprockets 48 is caused to advance in the machine 10 infeed direction while supporting upon the infeed conveyor transport spike 36 a carcass section in the wing outward disposed configuration supportably maintained by the infeed wing support guide rods for processing, while advancing from the infeed staging position 76, to the infeed load position 72, the next successive infeed conveyor transport spike 36 for continued successive manual placement impaled positioning of a carcass section 34 thereupon. The infeed load position 72 as above described is also shown in a simplified top plan view thereof as illustrated in FIG. 10a to be hereinafter more fully described.

As the carcass section is conveyably transported forward disposed in the internally impaled wing distended support configuration above described the wings are slidably engaged compressively from above laterally between the shoulder and wing tip joints thereof by the spring biased geometrically configured outward wing distension and shoulder joint dislocation guide rods 78, which serve to progressively distend during forward transport movement by said conveyor 22 of a carcass section the respective wing members thereof outward from the carcass section torso to a shoulder joint dislocated disposition whereby button cut removal of the whole wing members by means of the bilateral wing severing blade operational assemblies 24, when optionally set to operate are accomplished.

It will be noted that the outward wing distension and shoulder joint guide rods 78 are mounted in machine 10 support structure by means of support rods 80 which have affixed at the lower ends thereof pintle bearings 82 adapted to pivotally receive and supportably maintain guide rod pivot pintles 84 with the rotational moment of said rods 78 being adjustably operable against bias springs 86 respectively connectably interposed between frame connector 88 and rod connector 90.

Detailed consideration and description of the operation of bilateral wing severing blade operational assemblies 24 will be set forth hereinafter in specific reference to FIGS. 5 through 7 and the FIG. 10 series, however, during the indexing transport of a carcass section therethrough control is accomplished by means of conveyor slow down switch 92 and conveyor stop switch 94 sequentially activated by the transport spike bracket assembly switch trip 96 by trippable engagement thereof respectively with the conveyor slow down switch lever 98 and the conveyor stop switch lever 100, whereby the carcass section conveyable transport speed by conveyor 22 is slowed from the set run speed to a reduced speed to enable more precise positioning control over a carcass section 34 immediately prior to and during button cut removal of the whole wing sections, and stopped immediately thereafter, automatically, to facilitate proper registration in manual impalement placing of the next successive carcass section upon an infeed conveyor transport spike 36 at the infeed load position 72 having been advanced thereto from the infeed staging position 76 upon previous tripping of switch lever 42 and activation of infeed and transport conveyor start switch 40, and upon subsequent successive activation thereof by operator torso deflective contact therewith initiate continued indexed conveyance into and through the bilateral wing severing blade operational assemblies 24 of loaded carcass sections 34 in accomplishing button cut whole wing processing removal therefrom by the mechanism of machine 10 and the methods thereof. As shown in FIG. 1 the bilateral wing severing blade operational assembly 24 is comprised of a wing severing blade hydraulic drive motor 102 which provides rotary motion to the wing severing blade 104 variably through transmission 106 to the drive shaft 108 in turn to which said blade 104 is interchangeably assembled by bolt 110. Also assembled adjustably to the transmission 106 housing is the wing severing blade pivotal shield 112 by means of shield mounting and support bracket sub-assembly 114.

The immediate foregoing contemplates that wing severing blades 104 are assembled to the respective bilateral wing severing blade operational assemblies 24 and that button cut removal of whole wing members from the carcass section is one of the optionally selective processing cuts to be made. Presuming next the breast portion of the now de-winged carcass section is to be longitudinally split then the breast severing blade operational assembly 26 is set to engage and sever lengthwise by means of the breast severing blade 116 to de-winged carcass section remaining in impaled supportive disposition upon the initially utilized infeed conveyor transport spike 36 upon the next successive indexed drive activation of the infeed and transport conveyor 22 start switch 40 by means of operator torso deflective engagement of switch lever 42 as previously described. As will be hereinafter more clearly illustrated on consideration of subsequent Figures, the breast severing blade 116 is secured to the breast severing blade hydraulic motor drive shaft 118 by means of bolt and arbor assembly 120 whereby rotary drive motion is communicated to said severing blade 116 from the breast severing blade hydraulic drive motor 122. Selective optional employment of the breast severing blade operational assembly 26 in carcass section processing operations is simply accomplished by either assembling or not assembling the breast severing blade 116, as the case may be, to the breast severing blade hydraulic motor drive shaft 118 by means of the bolt and arbor assembly 120 therefor.

Lastly, in selective optional carcass section processing possibilities with the machine 10 of instant invention there is the alternative capability for either removing the carcass section backbone by employment of the backbone removal severing blade operational assemblies 28 or severing the backbone thereof longitudinally by otherwise utilizing the backbone severing blade operational assembly 30. Considering first with respect to the foregoing an optional processing removal of the carcass section backbone by means of employing the backbone removal severing blade operational assemblies 28 comprised of a downward angled adjustably spaced set of backbone removal severing blades 124 each respectively assembled to rotary drive shafts 126 by means also of bolt and arbor assemblies 120 to be powered by backbone removal severing blade hydraulic drive motors 128 such that a carcass section impaledly supported upon an infeed conveyor transport spike 36 as previously described, and transported thereunder on continued indexed activation of said infeed and transport conveyor 22 as also previously described, will be longitudinally engaged bilaterally the backbone thereof by said backbone removal severing blades 124 whereby the carcass section backbone is severably removed. Alternate to processing removal of the carcass section backbone, however, is the longitudinal severing thereof by means of the backbone severing blade operational assembly 30 through employment of a rotary backbone severing blade 130 which connected by bolt and arbor assembly 120 to direct drive shaft 132 communicatively powered by the backbone severing hydraulic drive motor 134 effects a longitudinal splitting of the carcass section backbone rather than a bilateral severable removal thereof.

Additional structural components of said machine 10 illustrated in FIG. 1 include the slot and compression bolt adjustment means 136 whereby the conveyor slow down and stop switches 92 and 94 respectively are adjusted and set longitudinally one with respect to the other in accommodating the physical size differences of different poultry species when setting said machine 10 to maintain precise control over carcass sections of a particular species upon which the selective option of button cut whole wing processing removal is being performed. Also shown in FIG. 1 with respect to carcass section control and processing placement and position adjustment means are the infeed conveyor transport spike carcass section placement registration stops 138 against which impaledly positioned carcass sections are set when manually loaded sequentially upon an infeed conveyor transport spike 36 at the infeed load position 72, and connected at the lower end of the infeed conveyor transport spike support bracket 140 is the longitudinally extending transport spike bracket assembly cant beam 142 with adjustment set bolts 44 whereby longitudinally angular adjustment and set of the transport spike 36 cooperatively by compressive differential elevation adjustment of said set bolts 144 against cleats 146 of said conveyor 22 and hence that also of a forward bilateral poultry carcass section 34 carried thereby may be both altered and set with respect to longitudinally horizontal elevation and angular attitude in relation to said operational assembly severing blade processing stations 24, 26, 28 or alternately 30.

Lastly shown in FIG. 1 is the hydraulic fluid reservoir 148 which serves all hydraulic drive motors of said machine 10 in circulation and recirculation of hydraulic fluid by communicating conduit connections between said reservoir 148 and hydraulic fluid inlet ports 150 and hydraulic outlet ports 152 of each of said hydraulic drive motors respectively.

Preferably the materials of construction of machine 10 are corrosive resistant metals such as stainless steel or the like, with conduit materials of a suitable temperature resistant impervious plastic, but any other suitable materials or combinations thereof may be used.

Referring now to FIG. 2, which is an enlarged side elevation of an exemplary eviscerated whole poultry carcass 154 showing therein a typical carcass severing line 156 whereby such a whole poultry carcass 154 is divided into a forward bilateral poultry carcass section 34, which is that portion of a poultry carcass processed by the method and machine 10 of instant invention, and a rearward bilateral poultry carcass section 158 which is delivered to other machinery for further and separate processing and is not a part of this patent or the invention covered thereby. Usually the whole poultry carcass bisecting cut made generally along severing line 156 is a hand operation carried out during the accomplishment of pre-processing steps at another processing station which would include also manual segregation of forward bilateral poultry carcass sections 34 into batches approximately the same size and weight so as to facilitate the setting of said machine 10 and thereafter enhance the initial and continued net output operation thereof during any particular batch processing run.

The specific anatomical structures of the forward bilateral poultry carcass section 34 illustrated in FIG. 2, which may be selectively subjected to processing operational treatment by the methods and machine 10 of instant invention, include the breast 160 which may be removed whole or longitudinally split either with or without the backbon 162 therewith and the whole wings 164 comprised of the tip 166 and arm segment 168 respectively joined each other and in turn attached bilaterally either side said forward bilateral poultry carcass section 34 at the shoulder joints 170 proximity the neck opening 172 thereof. Likewise, the whole wings 164 may selectively be removed by the button cut method hereof employing said machine 10 of instant invention or respectively left joined the breast 160 longitudinally severed with either the backbone split or removed therefrom.

Turning now to a concurrent consideration of FIGS. 3 and 4 respectively illustrating the machine 10 infeed end 18 with a forward bilateral poultry carcass section 34 impaledly engaged upon an infeed conveyor transport spike 36 as would be said carcass section 34 disposition in manual placement thereon immediately prior to operator torso engagement of the infeed and transport conveyor start switch 40 switch lever 42 whereby an indexed forward infeed movement of the infeed and transport conveyor 22 with said carcass section 34 upon an infeed conveyor transport spike 36 thereof is initiated. As shown in both FIGS. 3 and 4 said carcass section 34 has been engaged upon said spike 36 by the manner of manual placement insertion thereof through the carcass section neck opening 172 and further through the body cavity to a point where the respective shoulder joints 170 are each engaged and supportably positioned by the infeed conveyor transport spike carcass section placement registration stops 138. Also shown in FIG. 3, more clearly in terms of function than as previously illustrated in FIG. 1, are the transport spike support bracket stabilizers 182 which are elongated low-friction bar members adapted to adjustably engage the horizontal segments 184 of the infeed conveyor transport spike support brackets 140 in compressively communicating slidable contact when the infeed and transport conveyor 22 is in an indexed advance displacement mode, which stabilizers function to further enable a maintenance of running position control over forward bilateral poultry carcass sections 34 during accomplishment of selective processing operations thereon by the machine 10 of instant invention and the methods thereof. It will be noted that the respective stabilizers 182 are each backed by a corresponding elongated rigid stabilizer support bar member 186 having affixed thereto at regularly repeating spaced intervals downwardly projecting laterally spaced stabilizer bar retention tabs 188, and for accomplishing positioning adjustment set and supportable retention of the stabilizers 182 there are provided stabilizer maintaining and adjustment brackets 190.

Additionally shown in FIG. 3 is the transport spike guide rail 192 which provides overhead lateral stabilization to a carcass section loaded transport spike 36 also during a transport conveyor 22 indexed advance displacement, and operates by providing machine 10 infeed to delivery end close contact lateral and elevation movement restrained slidable engagement guidance capability of an impaledly positioned carcass section therebetween and with the corresponding infeed conveyor transport spike 36 and with the spaced spike connected upward projecting interior surfaces of the placement registration stops 138.

Manual placement positioning and loading of a forward bilateral poultry carcass section 34 is preferably as shown respectively in FIGS. 3 and 4, that is, with the carcass lateral opposingly positioned whole wings 164 outward disposed in a configuration such that the respective arm segments 168 thereof resiliently contact along the underside surfaces thereof intermediate the shoulder joints 170 and the tip joints 174 the infeed wing support guide rods 74 further such that upon forward activation of the infeed and transport conveyor 22 the arm segments 168 are engaged intermediate said shoulder joints 170 and tip joints 174 at the rod nip 194 between said infeed wing support guide rods 74 and the pivotally upward disposed spring biased outward wing distension and shoulder joint dislocation guide rods 78 whereby further outward distension of said whole wings 164 are guidably caused upon progressive forward movement of said carcass section 34 to thereby, as will be hereinafter more fully described and discussed, effect respective shoulder joint 170 dislocations preparatory to processing accomplishment of the button cut whole wing removal operation.

Figure 5:
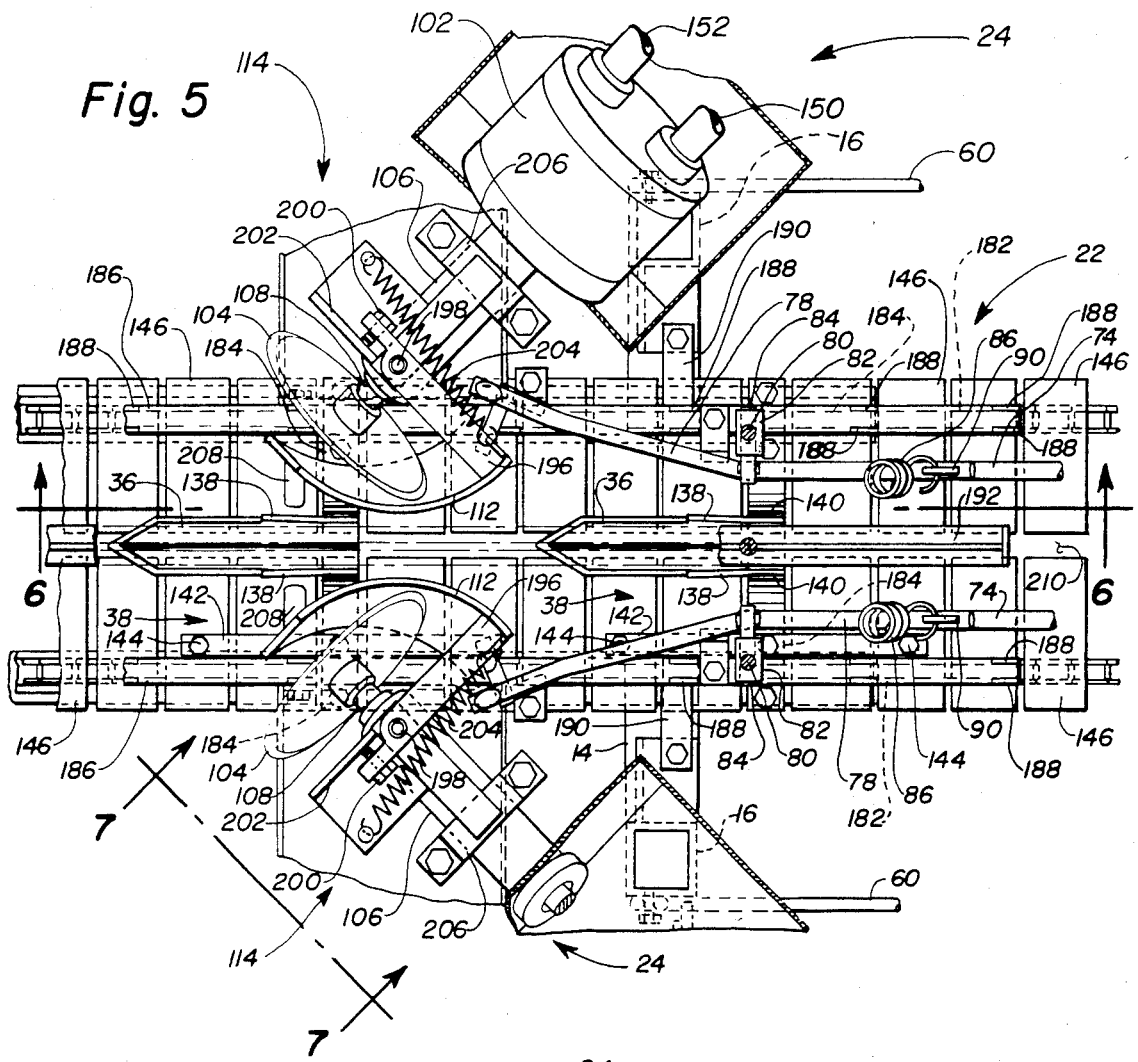
FIG. 5 is an enlarged top plan view of the processing machine optionally selective automated bilateral wing severing blade operational assemblies shown in FIG. 1 as seen along the line 5—5 thereof.
Figure 6:
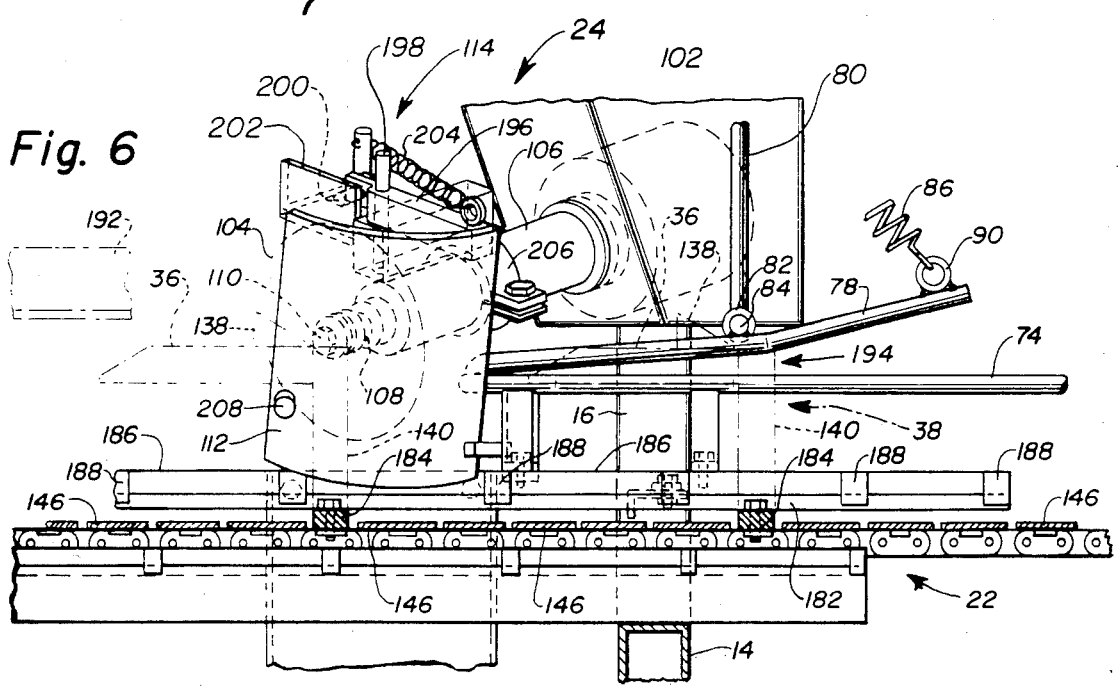
FIG. 6 is a side elevation of one of the optionally selective automated bilateral wing severing blade operational assemblies shown in FIG. 5 as seen along the line 6—6 thereof.
Figure 7:
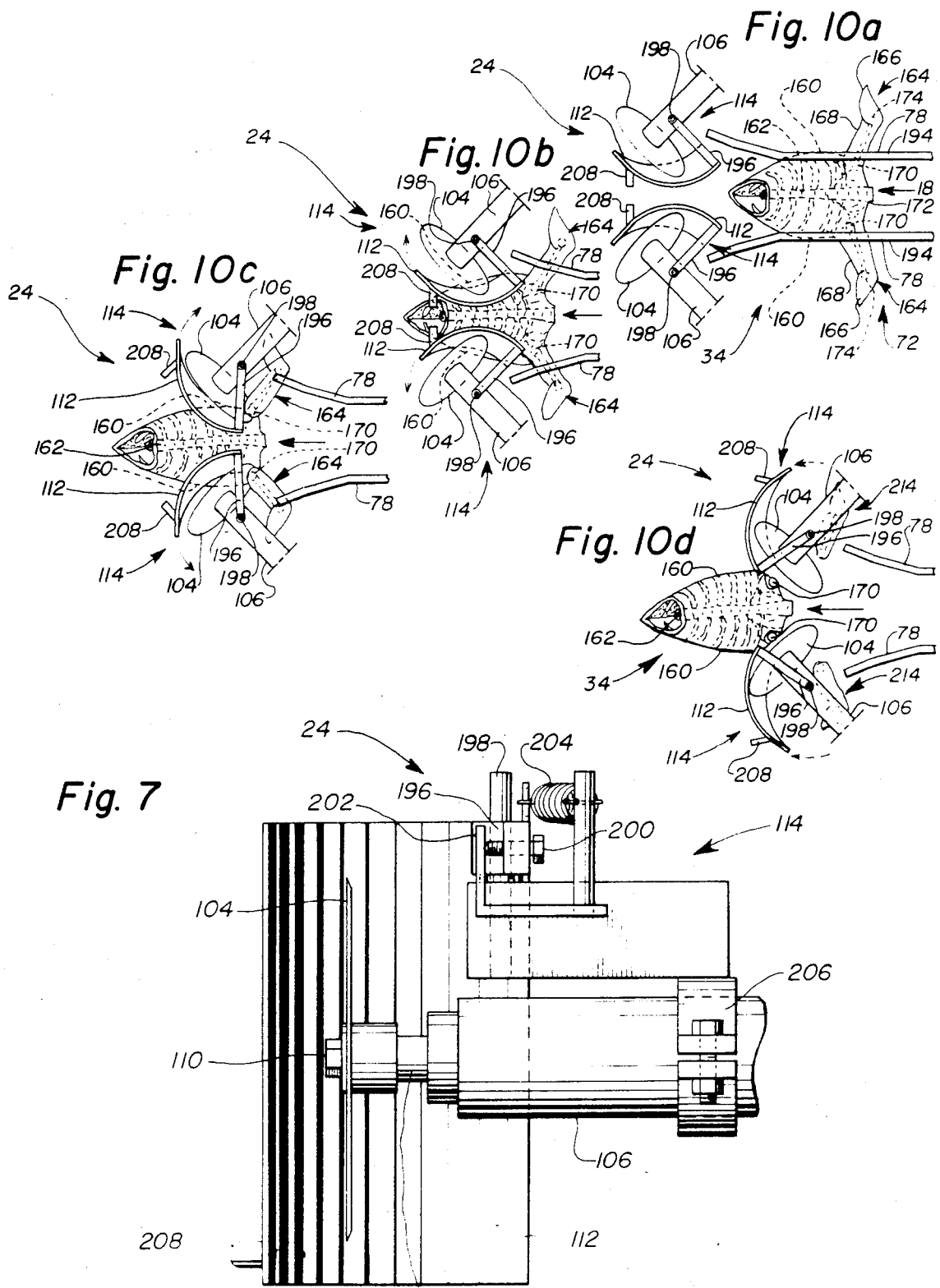
FIG. 7 is an enlarged end elevation of one of the optionally selective automated bilateral wing severing blade operational assemblies shown in FIG. 5 as seen along the line 7—7 thereof.

Referring now to FIGS. 5 and 6 wherein are respectively illustrated a top plan view of the bilateral wing severing blade operational assemblies 24, and a corresponding side elevation of one such assembly whereby button cut whole wing removal is accomplished. Considering at present, however, only the mechanical element aspects of said assemblies 24 leaving a detailed discussion of the methods of employment per set thereof for a subsequent consideration of the FIG. 10 series.

As shown, the respective wing severing blade pivotal shields 112 are supportably assembled to a shield pivot arm 196 rotatably mounted upon a pivot shaft 198 each of which said pivot arms 196 in turn are respectively biased to a set position by an adjustment bolt 200 operable against a stop plate 202 by the force of a shield return spring 204, all of which of each such sub-assemblies 114 are adjustably mounted to and supported as a co-active pivotal shield unit by means of the pivotal shield assembly compression clamp 206.

As will be hereinafter illustrated, the advancing carcass section engages the shield lugs 208 thus effecting coactive pivotal breast protective deflection of said shields 112 to that position where the respective carcass section shoulder joints are presented in a dislocated configuration to the wing severing blades 104, said dislocation configuration being cooperatively accomplished in conjunction with the concurrent outward distension of carcass section whole wing members by the outward wing distension shoulder joint dislocation guide rods 78 cooperatively operable with the infeed wing support guide rods 74 in effecting forward slidable outward movement of the respective arm segments 168 after engagements respectively thereof at the rod nips 194. The cooperative mechanical set and functioning of the outward wing distension and shoulder joint dislocation guide rods 78 with the wing severing blades 104 and the wing severing blade pivotal shields 112 in accomplishing whole wing button cut removal will be discussed in detail hereinafter on subsequent consideration of the FIG. 10 series hereof. Additional reference is made at this point, however, to FIG. 7 which illustrates an enlarged end elevation of one of the bilateral wing severing blade operational assemblies 24 and the shield mounting and support bracket sub-assembly 114 therefor showing in greater detail the relative spatial relationship thereof.

Figure 8:
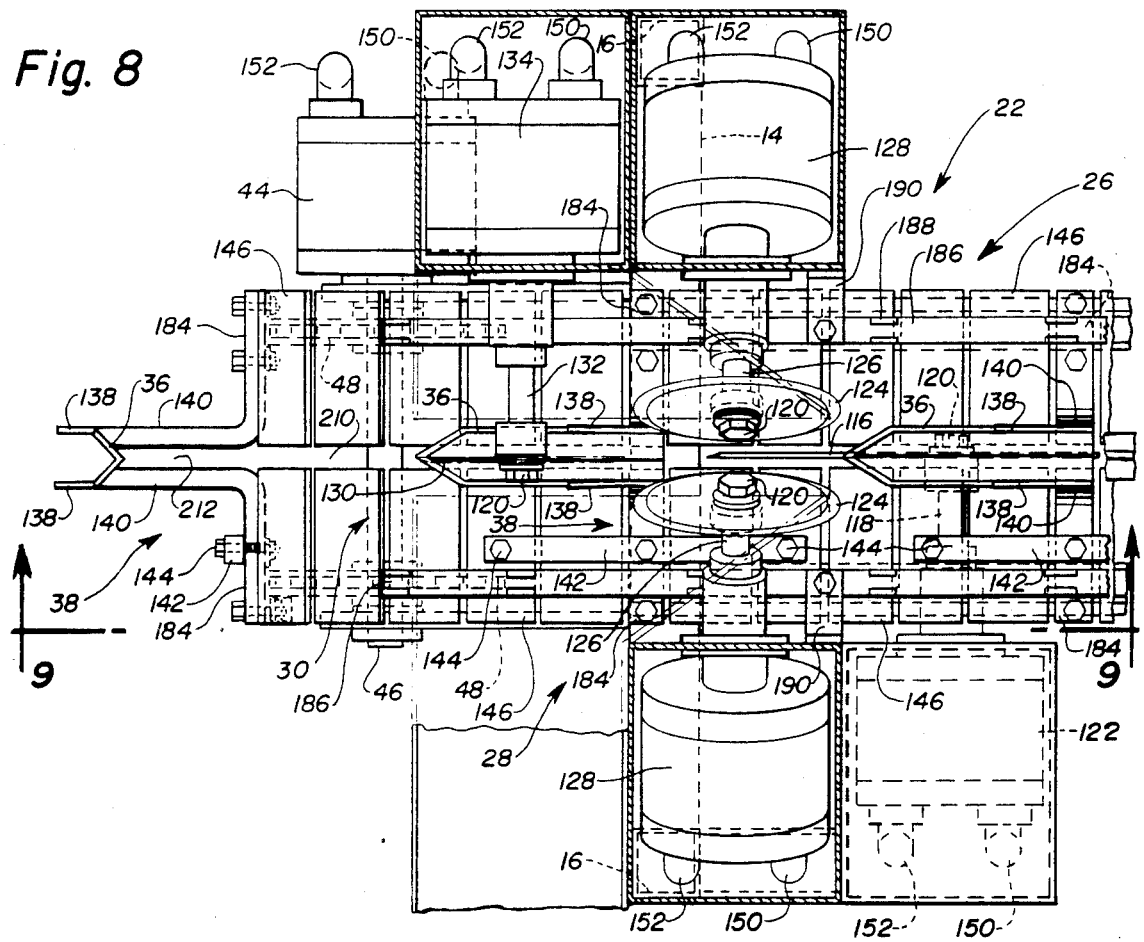
FIG. 8 is an enlarged top plan view of the processing machine optionally selective automated backbone removal and breast severing and alternately optionally selective automated backbone severing blade operational assemblies shown in FIG. 1 as seen along the line 8—8 thereof.
Figure 9:
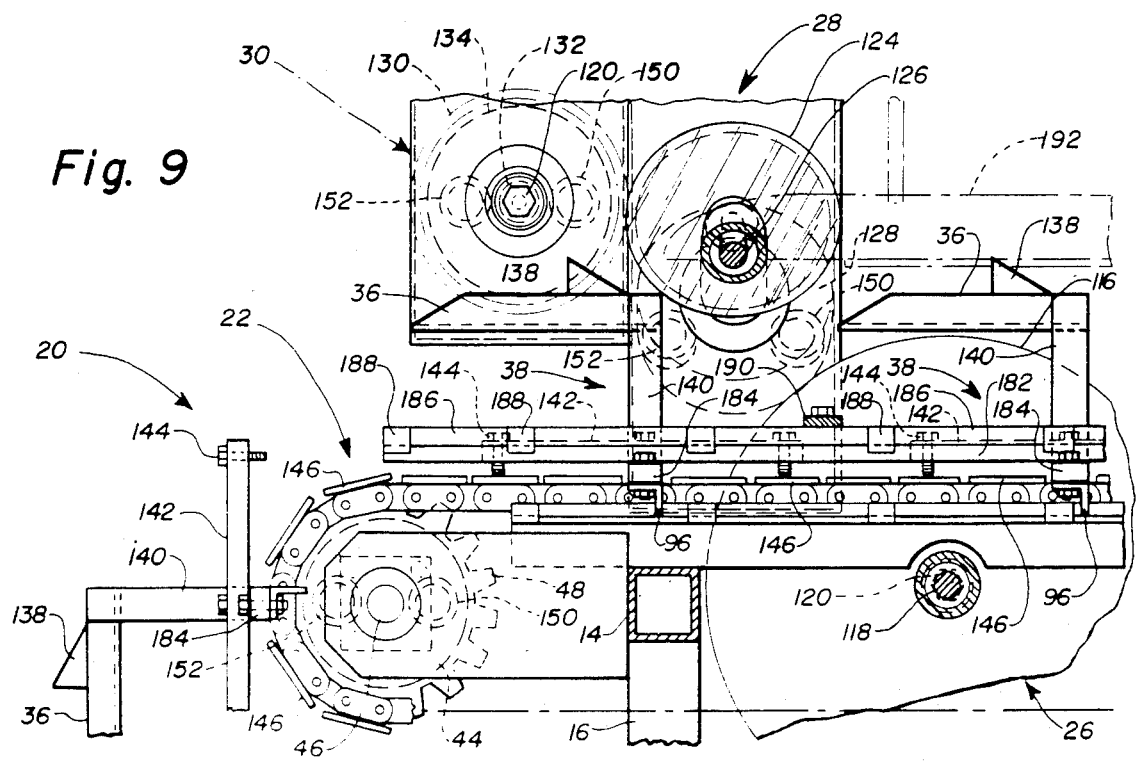
FIG. 9 is a side elevation of the top plan view shown in FIG. 8 as seen along the line 9—9 thereof.

Regarding now FIGS. 8 and 9 in concurrent consideration respectively illustrating a top plan view of the remaining machine 10 selectively optional carcass section severing stations and the delivery end 20 thereof, and a corresponding side elevation each sequentially showing first following the bilateral wing severing station just previously discussed the breast severing blade operational assembly 26 having the breast severing blade 116 which rotatably upward operates within the cleat slot 210 of the infeed and transport conveyor 22 and within the bracket slot 212 between the respective outward disposed legs of the infeed conveyor transport spike support bracket 140 to automatically effect a longitudinal halving cut of the carcass section breast during transport passage thereover.

It should be again noted that carcass section positioning and maintenance control during conveyable indexed transport through the remaining severing blade optionally operational assemblies 26 and 28, or alternate operational assembly 30, is accomplished by the transport spike guide rail 192 downward compressive slidable retentive force upon a rearward disposed forward leading carcass section impaledly mounted upon a transport spike 36 restrainably against the placement registration stops 138 thereof.

Lastly, a carcass section may be further processed to severably remove the backbone therefrom by means of the backbone removal severing blade operational assemblies 28 which mount, drive, and direct the backbone removal severing blades to either lateral side of the carcass section backbone as the carcass section is transported therebelow in a positioning and control maintained posture upon a transport spike 36 as immediately above described. As an optional alternate processing operation to severable removal of the carcass section backbone, the backbone may be centrally split by employing the backbone severing blade operational assembly 30, the alternate employment option being indicated by the rotary backbone severing blade 130 thereof being shown in phantom.

Considering now the FIG. 10 series wherein is shown a progressive set of illustrations demonstrating the button cut whole wing removal method of the instant machine 10 invention, with the simplified top plan view of FIG. 10a showing an exemplary transport spike impaledly mounted forward bilateral carcass section 34 just prior to slow down indexed infeed transport thereof to the bilateral wing severing blade operational assemblies 24 with the respective arm segments 168 thereof engaged at the rod nips 194 in the general proximities of the carcass section shoulder joints 170.

The simplified top plan view of FIG. 10b shows slowed transport positioning of the carcass section 34 protectively within the wing severing blade pivotal shields 112 at that point of advance where the shield lugs 208 thereof are engageably contacted by the advancing rearward leading forward edges of the carcass section whereupon pivotal deflection of the shields 112 commences. It will also be noted that the respective arm segments 168 are in the initial stages of outward distension and slight rearward rotation by means of the outward wing distension and shoulder joint dislocation guide rods 78 in the commencement of shoulder joint 170 dislocation prepatory to whole wing button cut removal, and, the wing severing blade pivotal shields 112 are positioned to prevent wing severing blade 104 premature contact with the carcass section 34 breast 160.

The simplified top plan view of FIG. 10c shows commencement of whole wing button cut removal where the respective wing severing blade pivotal shields 112 have been equally deflected by continued progressive forward transport engagement with the carcass section 34 breasts 160 to that point where the respective wing severing blades 104 are positioned to engage only the fully distended tissue and tendon materials of the now dislocated shoulder joints 170 in close tolerance severing thereof between the ball-and-socket bone end protuberances without cutting into or otherwise causing to be removed with the whole wings any portion of the carcass section breast meat per se.

The simplified top plan view shown in FIG. 10d illustrates the completion of whole wing button cut removal just prior to the forward infeed indexed cycle stop and conveyable transport of the dewinged carcass section past deflectable engagement with the wing severing blade pivotal shields 112 and the operational spring biased returns thereof to a processing station start position as previously illustrated in FIG. 10a. At this point the button cut removal wings 214 drop to suitable collection containers and the de-winged carcass section is transported further forward on the next indexed cycle for accomplishment of subsequent optionally selective machine 10 processing operations thereon or alternately forward to the delivery end for removal and consumer use thereof as is.

Figure 11A:
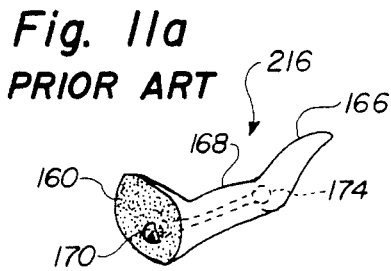
FIG. 11a illustrates an exemplary prior art wing removal severing cut accomplished by employment of otherwise presently available automated mechanical means showing a portion of the breast meat as is typically removed therewith.
Figure 11B:
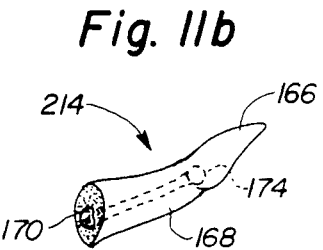
FIG. 11b illustrates an exemplary wing removal severing by the button cut as accomplished by the machine and method of instant invention.

The physical distinction difference is shown between a standard whole wing removal cut 216 with a portion of the breast 160 removed therewith as illustrated in FIG. 11a, and a button cut removed wing 214 as illustrated in FIG. 11b is made more clearly evident, wherein the button cut method accomplished by instant machine 10 invention optionally enables effecting automatic removal of whole wing sections from said carcass section with substantially no removal of any breast meat therewith.

Considering finally the FIG. 12 through FIG. 16 series wherein are illustrated in simplified form the various optionally selective machine 10 blade combinations and the corresponding carcass section 34 processing cuts respectively provided thereby.

Figure 12A:
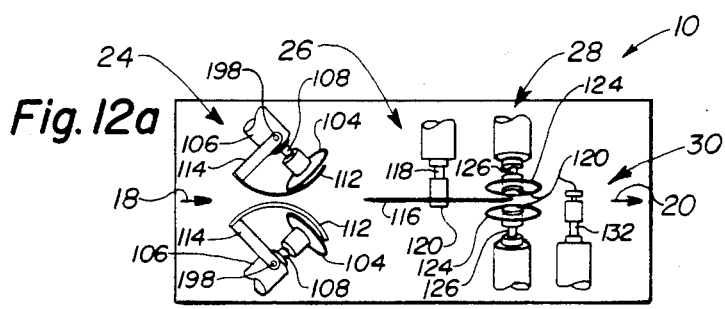
FIG. 12a is a simplified top plan view of the optionally selective automated severing blade assembly set-up of said processing machine of instant invention to yield from a forward bilateral poultry carcass section member infed thereto a bisected breast with wings and backbone removed therefrom as thereafter shown in corresponding simplified processed carcass section illustration of FIG. 12b.
Figure 12B:
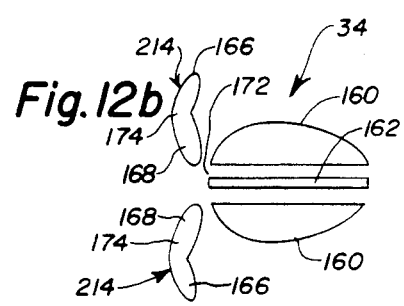

The FIG. 12a machine 10 optionally selective blade combination incorporates first a set-up of the bilateral wing severing blade operational assemblies 24 followed by the breast severing blade operational assembly 26 and thereafter the backbone removal severing blade operational assemblies 28 to process a forward bilateral carcass section 34 into a set of button cut removed wings 214 with a pair of longitudinally halved breast sections 160 and a removed backbone 162 as shown in FIG. 12b.

Figure 13A:
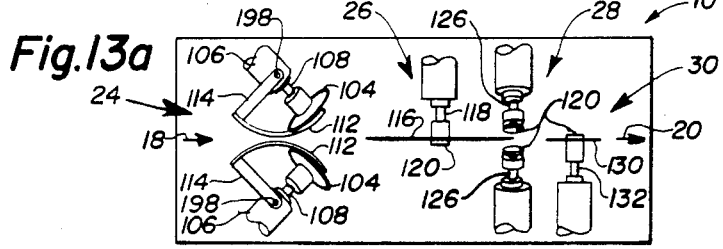
FIG. 13a is a simplified top plan view of the optionally selective automated severing blade assembly of said processing machine of instant invention alternately set-up to yield from a forward bilateral poultry carcass section member infed thereto a bisected breast with wings only removed therefrom as thereafter shown in corresponding simplified alternate processed carcass section illustration of FIG. 13b.
Figure 13B:
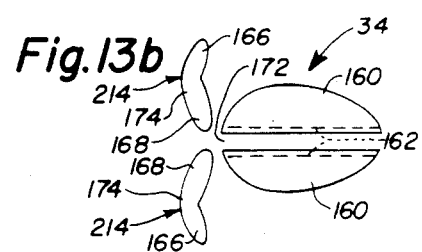

The FIG. 13a machine 10 blade combination optionally selective set-up replaces the station 28 blades with the alternately optional backbone severing operational assembly 30 to deliver a set of button cut removed wings 214 and a longitudinally halved breast section set 160 each including a longitudinally bisected backbone half 162 as shown in FIG. 13b.

Figure 14A:
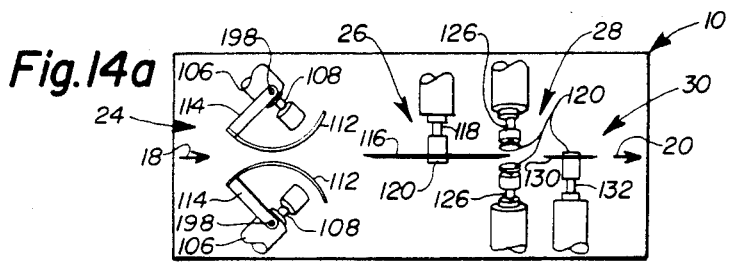
FIG. 14a is another simplified top plan view of the optionally selective automated severing blade assembly of said processing machine of instant invention alternately set-up to yield from a forward bilateral poultry carcass section member infed thereto a bisected breast with wings not removed therefrom as thereafter shown in corresponding simplified alternative processed carcass section illustration of FIG. 14b.
Figure 14B:
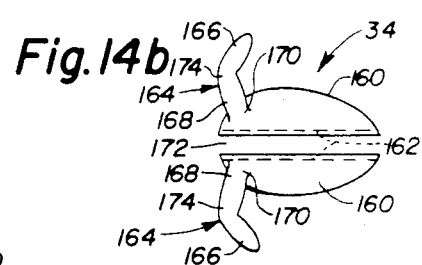

The FIG. 14a machine 10 blade combination optionally selective set-up embodies uses only of the breast severing blade operational assembly 26 and the backbone severing blade operational assembly 30 to yield a longitudinally bisected poultry carcass section comprised of breast 160 halves with whole wings 164 respectively thereto attached as shown in FIG. 14b.

Figure 15A:
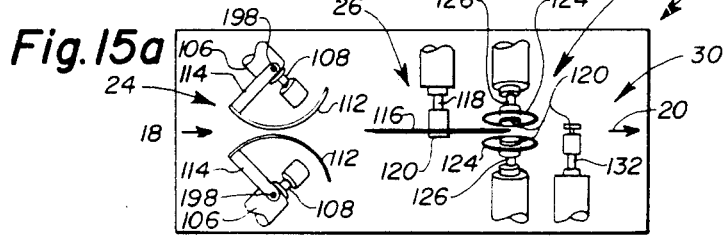
FIG. 15a is yet another simplified top plan view of the optionally selective automated servering blade assembly of said processing machine of instant invention alternately set-up to yield from a forward bilateral poultry carcass section member infed thereto a bisected breast with backbone removed therefrom but with wings not removed therefrom as thereafter shown in corresponding simplified alternative processed carcass section illustration of FIG. 15b.
Figure 15B:
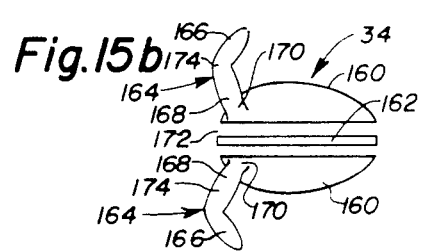

The FIG. 15a machine 10 blade combination optionally selective set-up replaces the station 30 blade with the alternately optional backbone removal severing blade operational assemblies 28 to deliver in this case a longitudinally bisected poultry carcass section of breast 160 halves with whole wings 164 respectively thereto attached but backbone 162 removed therefrom as shown in corresponding FIG. 15b.

Figure 16A:
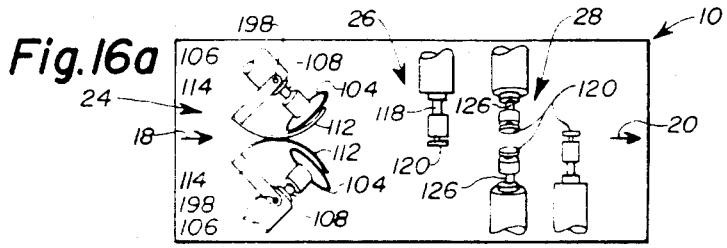
FIG. 16a is still another simplified top plan view of the optionally selective automated severing blade assembly of said processing machine of instant invention alternately set-up to yield from a forward bilateral poultry carcass section member infed thereto a whole breast with backbone remaining but with wings removed therefrom as thereafter shown in corresponding simplified alternative processed carcass section illustration of FIG. 16b.
Figure 16B:
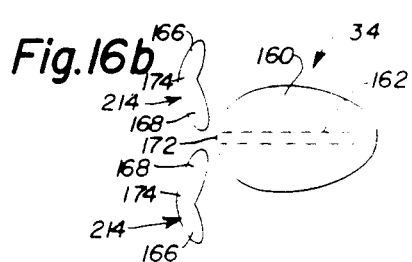

Lastly, the FIG. 16a machine 10 blade combination optionally selective set-up incorporates only the bilateral wing severing blade operational assemblies 24 to deliver a set of button cut removed wings 214 and a whole torso carcass section with backbone 162 remaining therein as shown in corresponding FIG. 16b.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices, apparatus, and methods.

I claim:

1. A poultry processing machine for providing button cut removal of a wing from the breast of a poultry carcass section at a shoulder joint connecting the wing to said breast, said machine including:
  a. conveyor means for directing the carcass section toward a delivery end of the machine;
  b. wing engaging means for extending the wing laterally outwardly from the breast to distend the tissue and tendon materials at the shoulder joint and to impose a shoulder joint dislocating force at a ball-and-socket connection of the shoulder joint;
  c. a severing blade assembly comprising:
    (1) a blade disposed laterally of the breast adapted to cut the tissue and tendon materials at the shoulder joint;
    (2) a shield pivotably mounted for movement in response to movement of the carcass section by the conveyor means toward the delivery end of the machine, said movement of the shield being from a set position laterally between the breast and blade for normally overlying the blade in a position to shield the blade from the breast, to a position overlying said breast and exposing the blade to the distended tissue and tendon materials at the shoulder joint, whereby movement of the carcass section by the conveyor means toward the delivery end of the machine causes close tolerance severing of the distended tissue and tendon materials at the shoulder joint and unobstructed passage between ball-and-socket bone end protuberances of the dislocated ball-and-socket joint.

2. The poultry processing machine of claim 1 including biasing means for returning the shield to the set position after severance of the wing from the breast.

3. The poultry processing machine of claim 2 including adjustment means for adjusting the set position of the shield relative to the blade.

4. The poultry processing machine of claim 1 characterized in that the shield includes a laterally extending projection engageable by a downstream end of the poultry carcass section for pivoting the shield from its set position to its blade exposing position.

5. The poultry processing machine of claim 4 including biasing means for returning the shield to the set position after severance of the wing from the breast.

6. The poultry processing machine of claim 5 including adjustment means for adjusting the set position of the shield relative to the blade.

7. The poultry processing machine of claim 1 including switch means for slowing the speed of the conveyor means prior to the blade severing the distended tissue and tendon materials.

8. The poultry processing machine of claim 7 characterized in that the shield includes a laterally extending projection engageable by a downstream end of the poultry carcass section for pivoting the shield from its set position to its blade exposing position.

9. The poultry processing machine of claim 8 including biasing means for returning the shield to the set position after severance of the wing from the breast.

10. The poultry processing machine of claim 1 including switch means for slowing the speed of the conveyor means prior to the blade severing the distended tissue and tendon materials and for stopping the conveyor means after removal of the wing from the breast.

11. The poultry processing machine of claim 10 characterized in that the shield includes a laterally extending projection engageable by a downstream end of the poultry carcass section for pivoting the shield from its set position to its blade exposing position.

12. The poultry processing machine of claim 11 including biasing means for returning the shield to the set position after severance of the wing from the breast.

13. The poultry breast processing machine for removing opposed lateral wings from the breast of a poultry carcass section at respective shoulder joints connecting the wings to said breast, said machine including:
  a. conveyor means for directing the carcass section toward a delivery end of the machine;
  b. wing engaging means disposed laterally adjacent each side of the carcass section for extending the wings laterally outwardly from the breast to distend the tissue and tendon materials at the shoulder joints and to impose a shoulder joint dislocating force at a ball-and-socket connection of each shoulder joint;
  c. a severing blade assembly disposed adjacent opposed lateral sides of the poultry carcass, each of said assemblies comprising:
    (1) a blade disposed laterally of the breast adapted to cut the distended tissue and tendon materials at the shoulder joint of an associated wing;
    (2) a shield pivotally mounted for movement in response to movement of the carcass section by the conveyor means toward the delivery end of the machine, said movement of the shield being from a set position laterally between the breast and blade for normally overlying the blade in a position to shield the blade from the breast, to a position overlying said breast and exposing the blade to the distended tissue and tendon materials at the respective shoulder joint, whereby movement of the carcass section by the conveyor means toward the delivery end of the machine causes close tolerance severing of the distended tissue and tendon materials at the respective shoulder joints and unobstructed passage between ball-and-socket bone end protuberances of the dislocated ball-and-socket joints.

14. The poultry processing machine of claim 13 including biasing means for returning each shield to the set position after severance of the respective wings from the breast.

15. The poultry processing machine of claim 14 characterized by adjustment means for adjusting the set position of each shield relative to its respective blade.

16. The poultry processing machine of claim 13 characterized in that each shield includes a laterally extending projection engageable by a downstream end of the poultry carcass section for pivoting the shield from its set position to its blade exposing position.

17. The poultry processing machine of claim 16 including biasing means for returning each shield to the set position after severance of the respective wings from the breast.

18. The poultry processing machine of claim 13 including switch means for slowing the speed of the conveyor means prior to the blade severing the distended tissue and tendon materials.

19. The poultry processing machine of claim 13 including switch means for slowing the speed of the conveyor means prior to the blade severing the distended tissue and tendon materials and for stopping the conveyor means after removal of the wing from the breast.

20. A button cut method of removing at least one whole wing member from a forward bilateral carcass section without either bone fiber contamination or substantial removal of breast meat therewith, said method comprising the steps of: supporting the carcass section through the body cavity thereof with the rearward end of such carcass section directed fowardly and the wing members thereof disposed adjacent opposed bilateral sides thereof; moving the supported carcass section fowardly while simultaneously slidably engaging and laterally distending said at least one wing member for distending tissue and tendon materials at the shoulder joint connecting said at least one wing member to the carcass section preparatory to severing said tissue and tendon materials and for imposing a shoulder joint dislocating force at a ball-and-socket connection of each shoulder joint; protectively shielding the breast section from contact with severing blade means by use of at least one pivotally deflectable blade shield overlying the blade in a position for overlying the breast; progressively deflecting the blade shield simultaneously with foward movement of the carcass section adjacent the shield for both shielding the breast and exposing the blade means to the distended tissue and tendon materials at the shoulder joint for cutting through said distended tissue and tendon materials and passing unobstructedly through dislocated ball-and-socket joint ends caused by lateral distention of said at least one wing member.

21. A button cut method of removing whole wing members from forward bilateral carcass sections without either bone fiber contamination or substantial removal of breast meat therewith, said method comprising the steps of: supporting the carcass sections through body cavities thereof with the rearward end of each carcass section directed forwardly and the wings thereof disposed adjacent opposed bilateral sides thereof; moving the supported carcass sections fowardly while simultaneously slidably engaging and laterally distending progressively the wings for distending tissue and tendon materials at the shoulder joints and for effecting dislocation of the ball-and-socket joint of each said shoulder joints prior to directing a severing blade through each of the ball-and-socket joints; protectively shielding the breast sections from contact with the severing blades with pivotally deflectable blade shields overlying the blades for engaging the breasts and deflectable upon foward movement of a forward carcass section for exposing the severing means to the shoulder joint distended connecting tissue and tendon materials for cutting the distended connecting tissue and tendon materials of the moving forward carcass section and passing unobstructedly through dislocated ends of the ball-and-socket joints for effecting button cut removal of whole wing members.

22. A poultry processing machine for providing button cut removal of a wing from the breast of a poultry carcass section at a shoulder joint connecting the wing to said breast, said machine including:

a. conveyor means for directing the carcass section toward a delivery end of the machine;
b. wing engaging means for extending the wing laterally outwardly from the breast to distend the tissue and tendon materials at the shoulder joint and to impose a shoulder joint dislocating force at a ball-and-socket connection of the shoulder joint;
c. a severing blade assembly comprising:
  (1) a blade disposed laterally of the breast adapted to cut the tissue and tendon materials at the shoulder joint;
  (2) a shield pivotably mounted for movement in response to movement of the carcass section by the conveyor means toward the delivery end of the machine, said shield having a curved outer surface, said movement of the shield being from a set position laterally between the breast and blade for normally overlying the blade in a position to shield the blade from the breast, to a position exposing the blade to the distended tissue and tendon materials at the shoulder joint, whereby movement of the carcass section by the conveyor means toward the delivery end of the machine causes close tolerance severing of the distended tissue and tendon materials at the shoulder joint and unobstructed passage between ball-and-socket bone end protuberances of the dislocated ball-and-socket joint.

23. The poultry processing machine of claim 22 wherein the curved outer surface of the shield engages the breast when the shield is in the blade-exposing position.

24. The poultry processing machine of claim 22 wherein said shield has a curved inner surface adjacent the blade.

25. The poultry processing machine of claim 24 including biasing means for returning the shield to the set position after severance of the wing from the breast.

26. The poultry processing machine of claim 22 including biasing means for returning the shield to the set position after severance of the wing from the breast.

27. The poultry processing machine of claim 26 including adjustment means for adjusting the set position of the shield relative to the blade.

28. The poultry processing machine of claim 22 characterized in that the shield includes a laterally extending projection engageable by a downstream end of the poultry carcass section for pivoting the shield from its set position to its blade-exposing position.

29. The poultry processing machine of claim 22 including switch means for slowing the speed of the conveyor means prior to the blade severing the distended tissue and tendon materials.

30. The poultry processing machine of claim 22 including switch means for slowing the speed of the conveyor means prior to the blade severing the distended tissue and tendon materials and for stopping the conveyor means after removal of the wing from the breast.

31. A poultry processing machine for providing button cut removal of a wing from the breast of a poultry carcass section at a shoulder joint connecting the wing to said breast, said machine including:

a. conveyor means for directing the carcass section toward a delivery end of the machine;
b. wing engaging means for extending the wing laterally outwardly from the breast to distend the tissue and tendon materials at the shoulder joint;
c. a severing blade assembly comprising:

(1) a blade disposed laterally of the breast adapted to cut through tissue and tendon materials at the shoulder joint;

(2) a shield pivotably mounted for movement in response to movement of the carcass section by the conveyor means toward the delivery end of the machine, said movement of the shield being from a set position laterally between the breast and blade for normally overlying the blade in a position to shield the blade from the breast, to a position overlying said breast and exposing the blade to the distended tissue and tendon materials at the shoulder joint, whereby movement of the carcass section by the conveyor means toward the delivery end of the machine causes close tolerance servering of the distended tissue and tendon materials at the shoulder joint and separation of the wing from the breast.

32. The poultry processing machine of claim 31 including biasing means for returning the shield to the set position after severance of the wing from the breast.

33. A poultry processing machine for removing opposed lateral wings from the breast of a poultry carcass section at respective shoulder joints connecting the wings to said breast, said machine including:

a. conveyor means for directing the carcass section toward a delivery end of the machine;

b. wing engaging means disposed laterally adjacent each side of the carcass section for extending the wings laterally outwardly from the breast to distend the tissue and tendon materials at the shoulder joints;

c. a severing blade assembly disposed adjacent opposed lateral sides of the poultry carcass, each of said assemblies comprising:

(1) a blade disposed laterally of the breast adapted to cut the distended tissue and tendon materials at the shoulder joint of an associated wing;

(2) a shield pivotally mounted for movement in response to movement of the carcass section by the conveyor means toward the delivery end of the machine, said movement of the shield being from a set position laterally between the breast and blade for normally overlying the blade in a position to shield the blade from the breast, to a position overlying said breast and exposing the blade to the distended tissue and tendon materials at the respective shoulder joint, whereby movement of the carcass section by the conveyor means toward the delivery end of the machine causes close tolerance severing of the distended tissue and tendon materials at the respective shoulder joints and separation of the respective wings from the breast.

34. The poultry process machine of claim 33 including biasing means for returning each shield to the set position after severance of the respective wings from the breast.

35. A poultry processing machine for providing button cut removal of a wing from the breast of a poultry carcass section at a shoulder joint connecting the wing to said breast, said machine including:

a. conveyor means for directing the carcass section toward a delivery end of the machine;

b. wing engaging and severing means for extending the wing laterally outwardly from the breast to distend the tissue and tendon materials at the shoulder joint and for thereafter severing the wing from the breast, said wing engaging and severing means including:

(1) wing gripping surface means for maintaining the wing in an extended position to distend the tissue and tendon materials at the shoulder joint, and (2) a severing blade assembly for severing the wing from the breast while said wing is retained in an extended position by the wing gripping surface means, said severing blade assembly comprising:

(a) a blade disposed laterally of the breast adapted to cut through the tissue and tendon materials at the shoulder joint while the wing is maintained in extended condition, and (b) a shield pivotably mounted for movement in response to movement of the carcass section by the conveyor means toward the delivery end of the machine, said movement of the shield being from a set position laterally between the breast and blade for normally overlying the blade in a position to shield the blade from the breast, to a position overlying said breast and exposing the blade to the distended tissue and tendon materials at the shoulder joint.

* * * * *